June 29, 1926.
S. A. REED
1,590,699
AERONAUTICAL PROPELLER
Filed May 12, 1924
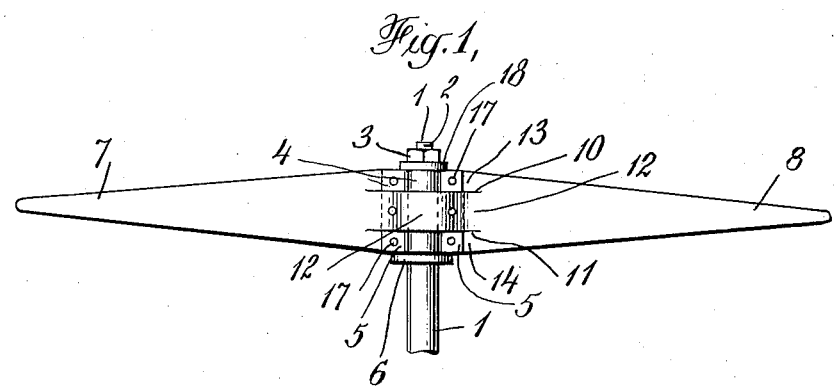
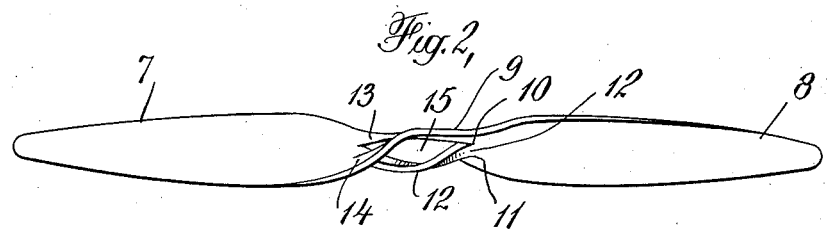
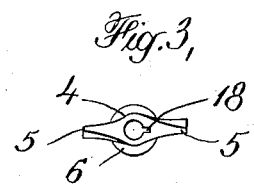
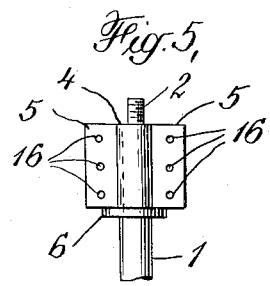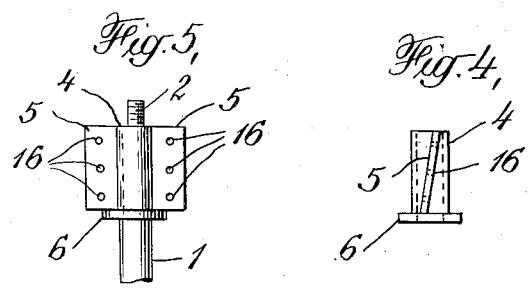
INVENTOR
Sylvanus A. Reed,
BY
Willis Fowler
ATTORNEY.

Patented June 29, 1926.

1,590,699

UNITED STATES PATENT OFFICE.

SYLVANUS A. REED, OF NEW YORK, N. Y., ASSIGNOR TO THE REED PROPELLER CO. INC., OF NEW YORK, N. Y., A CORPORATION OF NEW YORK.

AERONAUTICAL PROPELLER.

Application filed May 12, 1924. Serial No. 712,647.

This invention relates generally to propellers for aeronautical purposes and it is well adapted for use in connection with metal propellers.

In my U. S. Patent No. 1,463,556, dated July 31, 1923, and also in my pending application for patent Serial No. 570,139, filed June 22, 1922, I disclose certain forms of my types of metal aeronautical propellers, and my present improvements are applicable to said forms, but, of course, are not limited thereto.

One object of my present invention is to simplify the means for mounting a propeller in connection with the driving mechanism or hub and securing the same thereto for the safe transmission of torque and thrust. In thus simplifying the structure, I am enabled to omit the usual features heretofore required for inter-changeability with customary wooden propellers on the same metal hub and to dispense with the need of a special construction of engine shaft, at the same time obtaining greater efficiency and strength with less aggregate weight. I also obtain a closer approximation to a true helix nearly up to the drive-shaft itself, and dispense with a central boss which not only obstructs flight, but is an additional weight and absorbs a certain amount of power.

In the form of my invention herein shown, there is also present the novel feature of having a propeller provided with a continuous twist from tip to tip, and while this construction possesses certain advantages in conjunction with the peculiar form of mounting means herewith set forth, said novel feature forms part of the subject-matter of another pending application for patent of mine, filed on even date herewith and wherein it is broadly claimed.

A certain form of this invention is herewith described and set forth and shown in the drawings, wherein;

Fig. 1, is a side elevation of an embodiment of my invention and shows a broadside view of the propeller mounted on a hub on the drive-shaft.

Fig. 2, shows a view of the detached propeller, the view being taken at right-angles to that shown in Fig. 1, and looking through the axially disposed socket.

Fig. 3, is a top end view of the hub shown as detached.

Fig. 4, is a side elevation of the detached hub.

Fig. 5, is a side elevation of the hub placed on the end of the shaft.

Referring to the drawings, 1 indicates a drive-shaft provided with thread 2, for receiving the nut 3. The hub comprises a sleeve 4, provided with lateral fins or ribs 5, arranged opposite each other and having a diagonal trend lengthwise the sleeve. The lower end of the sleeve is formed with an annular flange 6, and the sleeve is placed on the shaft and held thereon by the nut 2, after the hub and propeller have been assembled.

The propeller herewith shown is the single piece metal type, comprising the two oppositely extending blades 7, 8, and a central blade-connecting part 9, and while said elements are herein shown as an integral, unitary structure, it may be formed otherwise with the blades separate.

The central region or connecting part 9, is formed with a series of two longitudinal slits 10, and 11, extending preferably parallel with each other and a considerable distance from the side-edge of the part, the slits being disposed substantially in planes which cut the axis of rotation of the propeller. This provides a series of strips or members, the strip 12, lying between the slits and the strip 13, above the slit 10 and the strip 14, below the slit 11. The central strip 12, is bent or displaced outwardly, viewing it in Fig. 1, and the upper and lower strips are pushed rearwardly or inwardly and so as to provide an axially disposed passage 15, as shown clearly in Fig. 2. As the single piece structure comprising the blades and the intermediate blade uniting part is preferably given a continuous twist from the tip of one blade to the tip of the other, so as to provide the pitch-angles for the blades, this gives a certain deformation or angle to the central blade-connecting part which is now formed into three strips which are displaced alternately in opposite directions. This results in the peculiar disposition of the strips, which is indicated substantially in Fig. 2, and the elongated socket 15, to fit which the fins or ribs 5, upon the exterior of the hub are given a diagonal trend, as clearly shown in Figs. 3 and 4. This arrangement makes an extended area of contact between the hub-fins and the inner walls of the socket formed by said strips and provides a strong and secure connection between the hub and propeller, and affords safe means for transmission of torque and thrust.

The hub-fins are formed with rows of bolt-holes 16, which register with corresponding bolt-holes in the respective socket-strips 12, 13 and 14, for the reception of short bolts 17, by means of which the propeller is securely attached to the hub 4, which is provided upon its interior with a key-way 18, for reception of a key to lock the hub to the shaft 1.

The structure which I thus provide is reduced to a few simple parts requiring very short bolts to secure them together when placed in operation, and I thereby make a material reduction in the weight of the hub attaching means. The laterally protruding loops or straps 12, 13 and 14, are integral with the central part of the propeller, and they are pushed or displaced a sufficient distance to provide the size of passage way 15, required. When the hub has the propeller mounted on it, the inner edge of the latter rests against the annular shoulder or flange 6, on the inner end of the hub and then a washer 18, on the shaft is placed against the outer edge of the propeller, with the nut 3, clamping the washer against the propeller. As the fins 5, of the hub are made integral therewith, the parts thus assembled provide a strong and simple construction with little liability of loosening when in operation. The blades of the propeller and the central connecting part are here shown as being deformed or bent so as to provide the desired pitch angles for the blades.

The propeller is preferably made of a solid metal plate of a light-weight metal alloy, such as aluminum alloys, for example, duralumin.

I wish to be understood as not limiting my invention to the particular forms herein set forth, as it is manifest that various modifications may be made in the several different parts thereof, without, however, departing from the spirit of my invention.

Having thus described my invention, what I claim and desire to secure by Letters Patent is:

1. An aeronautical propeller having blades and a central part to which said blades are connected, said central part being provided with strips displaced outwardly in alternately opposite directions to provide an axially disposed socket and constructed and arranged to receive between them a hub member and a non-circular hub member mounted in said socket.

2. An aeronautical propeller having blades and a central blade-connecting part having a series of slits therein with the intervening integral strips of material displaced outwardly in alternately opposite directions and constructed and arranged to receive between them a hub so as to transmit its motion thereto and a hub member provided with inclined fins mounted between said strips.

3. An aeronautical propeller provided with blades and having a central part connecting said blades, said central part being provided with integral strips pushed outwardly in alternately opposite directions, and a hub having lateral projections fitting between said oppositely disposed strips and constructed and arranged to be placed between the same in driving engagement therewith.

4. An aeronautical propeller having blades and a central part connecting said blades, said central part being provided with outwardly extending strips, and a hub having laterally projecting exterior members constructed and arranged to be placed between said strips in driving engagement therewith.

5. An aeronautical propeller formed of a single piece and having a central blade-uniting part provided with a series of slits with the intervening portions displaced laterally in alternately opposite directions so as to provide an axially disposed socket for receiving a hub.

6. An aeronautical propeller having blades and a central part to which said blades are connected, said central part being formed with a series of slits lying in planes cutting the axis of rotation and having the intervening material displaced outwardly in alternately opposite directions so as to provide between said extensions an axially disposed hub socket.

7. An aeronautical propeller made from a single piece of material and having blades and a central blade-uniting part, said blades being provided with pitch-angles and the said central part being formed with angles to accommodate those of said blades, said central part being provided with outwardly projecting strips disposed in alternately opposite directions so as to provide an axially disposed socket for the reception and mounting of a hub member and a hub member having fin members for driving said blades.

8. An aeronautical propeller having blades and a central blade-connecting part and formed from an elongated metal plate with a continuous twist from tip to tip of the blades to provide pitch-angles therefor, said central part being provided with strips bulging from opposite sides of the same so as to provide an axially disposed passage for the reception of a driving-member.

9. An aeronautical propeller having blades and a central blade-connecting part and formed from an elongated metal plate with a continuous twist from tip to tip of the blades to provide pitch-angles therefor, said central part being provided with strips bulging from opposite sides of the same so as to provide an axially disposed passage for the reception of a driving-member and a tubular metal hub with lateral fins adapted to pass through the said passage and to fit therein, and means for securing the parts together.

10. An aeronautical propeller having blades and a central part to which the blades are secured, said central part being formed with an axially disposed hub-receiving socket having lateral extensions in the direction of the blades, a hub fitting said socket and provided with laterally projecting fins fitting said socket extensions, and said hub having an internal keyway for mounting on an engine shaft.

In testimony whereof, I have hereunto set my hand.

SYLVANUS A. REED.